United States Patent [19]

Oliver et al.

[11] 3,831,153

[45] Aug. 20, 1974

[54] METHOD FOR QUASI CONTINUOUS OPERATION OF AN ELECTRO-OPTIC IMAGE CONVERTER

[75] Inventors: Donald S. Oliver, Acton; Paul Vohl, Lexington, both of Mass.

[73] Assignee: Itek Corporation, Lexington, Mass.

[22] Filed: Nov. 30, 1972

[21] Appl. No.: 310,756

[52] U.S. Cl. .... 340/173 LS, 340/173 R, 250/219 Q

[51] Int. Cl. .... G11c 11/42

[58] Field of Search .... 340/173 R, 173 CC, 173 LS; 250/219 Q

[56] References Cited

UNITED STATES PATENTS

| | | | |
|---|---|---|---|
| 2,985,757 | 5/1961 | Jacobs | 340/173 CC |
| 3,341,825 | 9/1967 | Schrieffer | 340/173 CC |
| 3,374,473 | 3/1968 | Cummings | 340/173 CC |
| 3,428,396 | 2/1969 | Megla | 340/173 R |

*Primary Examiner*—Terrell W. Fears

*Attorney, Agent, or Firm*—Homer O. Blair; Robert L. Nathans; David E. Brook

[57] ABSTRACT

An improved method for the operation of an image converter or optical buffer store formed from electro-optic and photoconductive materials is disclosed. In general, the method comprises operating the converter to take advantage of the material's inherent type of photoconductivity to maximize its photosensitivity to incident radiation. If the image converter, for example, is formed from a cubic, single crystal of bismuth silicon oxide $Bi_{12}SiO_{20}$), an n-type photoconductor, then negatively biasing the illuminated electrode for write and/or erase/prime functions results in a large change in the electro-optic read-out light compared to positively biasing the illuminated electrode. Thus, both the write and erase/prime steps take advantage of the greater mobility of photogenerated electrons compared to holes to maximize the efficiency of these steps. In like manner, positively biasing the illuminated electrode can minimize the crystal's sensitivity to electro-optic read-out radiation.

19 Claims, 5 Drawing Figures

METHOD FOR QUASI CONTINUOUS OPERATION OF AN ELECTRO-OPTIC IMAGE CONVERTER

BACKGROUND OF THE INVENTION

1. Field of the Invention

This invention is in the field of electro-optic image converters, and more particularly in the field of electro-optic image converters formed from single crystal materials having an electro-optic effect and a photoconductive effect.

2. Description of the Prior Art

Electro-optic image converters using single crystal materials have been described in the prior art. See for example, Oliver, U.S. Pat. No. 3,517,206 and Oliver, D. S. and Buchan, W. R., "An Optical Image Storage and Processing Device Using Electro-optic ZnS," *IEEE Transactions on Electron Devices*, pp. 769–773, September, 1971. In general, such image converters are formed from materials having electro-optic properties and photoconductive properties. Some examples of electro-optic materials include potassium dihydrogen phosphate (KDP) and dipotassium dihydrogen phosphate (DKDP). Photoconductive materials include cadmium or zinc sulfides and selenides, zinc oxide, etc. In some cases, one material will possess both electro-optic and photoconductive properties. Some examples of electro-optic materials include potassium dihydrogen phosphate (KDP) and dipotassium dihydrogen phosphate (DKDP). Photoconductive materials include cadmium or zinc sulfides and selenides, zinc oxide, etc. In some cases, one material will possess both electro-optic and photoconductive properties, and single crystals of cubic zinc sulfide, zinc selenide and bismuth silicon oxide are examples of such materials.

In practice, the real time operation of such electro-optic image converters is carried out by the application of a continuous sequence of short electrical pules applied to the device at the desired duty cycle rate. Each cycle or frame constitutes a period of time in which an optical write-in, read-out and erase/prime function can be performed. During a subsequent frame, a new cycle of optical information can be processed or the previous cycle can be repeated. The rate at which these frames can be cycled and still perform the required processing of new optical write-in information constitutes the rate at which the converter can operate.

Although write-in and read-out functions have been performed rapidly in such electro-optic converters in the past, the main problem preventing rapid write-in of new information has been the problem of independently erasing the old information present in the converter and priming the converter to receive new write information. There has been a need, therefore, for a rapid, efficient technique for independently erasing and priming the converter to receive a new optical write-in image so that the electro-optic converters can be operated in a quasi continuous mode.

SUMMARY OF AN EMBODIMENT OF THE INVENTION

In one embodiment, this invention relates to an improved technique for operating an electro-optic image converter in a quasi continuous mode. This is accomplished by arranging the incident absorbed illumination so that it exposes the appropriately biased face of the crystal to take advantage of the crystal's inherent type of photoconductivity.

In the normal operation of a converter formed from an n-type material such as bismuth silicon oxide, the write-in and erase exposures occur in sequence. The write-in exposure on a negatively biased surface generates mobile charge carriers, i.e., electrons, which drift under the influence of an applied electric field to the opposite face. The erasing step must essentially reverse this process. Therefore, the opposite crystal face is subsequently negatively biased and exposed to erase light causing newly generated mobile electrons to drift back to the face illuminated with write-in light. Thus, write-in and erase/prime illumination occurs on opposite crystal faces at times when those faces are negatively biased.

This technique takes advantage of several fundamental properties of the electro-optic material to achieve quasi continuous image conversion with high speed recyclability as is required by real time operation applications. When the electro-optic crystal is bismuth silicon oxide, the technique takes advantage of: (1) the large photoconductivity effect in bismuth silicon oxide; (2) the large drift range of photo-injected electrons as compared to photo-injected holes; and, (3) the in-series structure of the electro-optic material and the dielectrics which serve to divide the applied voltage and distribute it between the electro-optic material and the dielectric layers according to the direction of drift of the photo-induced carriers.

BRIEF DESCRIPTION OF THE DRAWINGS

FIG. 1 including

DESCRIPTION OF PREFERRED EMBODIMENTS

Figure 1A:
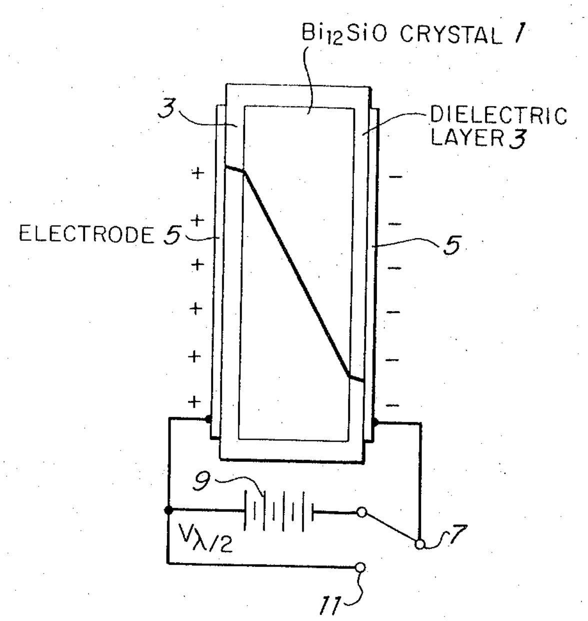
FIGS. 1(a)—(d) is a schematic illustration of an electro-optic image converter and the various sequence of operations used according to this invention.
Figure 1B:
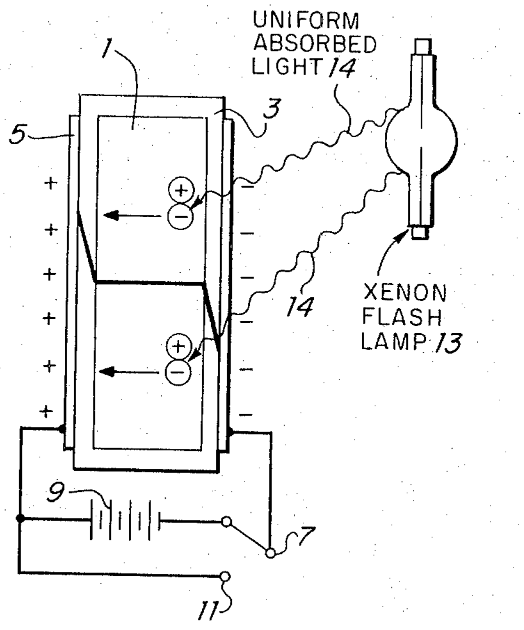
Figure 1C:
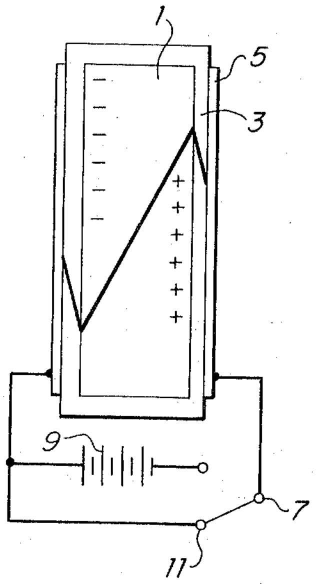
Figure 1D:
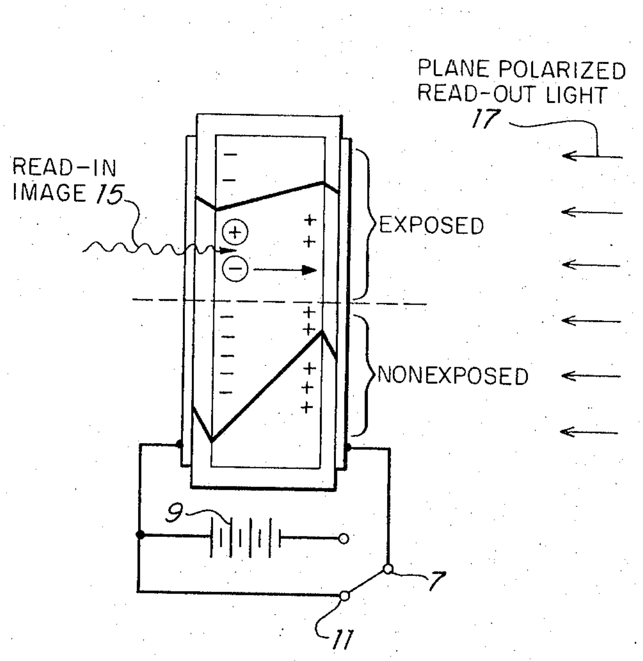

Referring now to the Figures in more detail, FIG. 1(*a*) illustrates an electro-optic image converter formed from a cubic single crystal of bismuth silicon oxide 1 sandwiched between insulating dielectric layers 3. The insulating dielectric layers 3 can be formed from a layer of material such as Parylene, sold by Union Carbide. Commonly, such insulating layers are about 3 micrometers thick, whereas the bismuth silicon oxide is commonly about 350–375 micrometers thick. The thicknesses depend, of course, on the capacitances desired in each layer of the converter.

Transparent electrodes 5, which can be formed by evaporating a transparent conductive film such as platinum on top of dielectric layers 3, are connected by switch 7 to battery 9 or to a short circuit position 11. When an external voltage is applied, the voltage drop occurs mainly across the crystal due to its having a much lower capacitance than the insulating layers. This is illustrated by the solid line which represents the voltage drop across the converter when switch 7 is closed to connect battery 9 to electrodes 5. The preferred applied voltage is a voltage approximately equal to the half-wave voltage of the electro-optic material for transmitting readout, and approximately equal to half of the half-wave voltage for retro-reflection readout.

Bismuth silicon oxide is an exceptionally good material for an electro-optic image converter as described herein. As reported in the literature, it has an intermediate bandgap ($E_g$=3.25$eV$), high electrical resistance (resistivity in excess of $1\times10^{13}$ ohm-cm at room temperature), good photoconductivity, and has an unusually low electro-optic half-wave voltage ($V_{\lambda/2}$=3900 volts). It should be recognized, however, that there are other materials which can be used. These can be composites of an electro-optic material and a photoconductive material, or one material possessing both properties. Many of these other materials have been reported in the literature, and a further description of these can be found in the following references, the teachings of which are hereby incorporated by reference: Oliver, U.S. Pat. No. 3,517,206; Oliver and Buchan, "An Optical Image Storage and Processing Device Using Electro-optic ZnS," *IEEE Transactions on Electron Devices*, pp. 769–773, September, 1971; Hou and Oliver, Appl. Phys. Lett. 18, 325 (1971).

In FIG. 1(*b*), the converter is erased and primed to receive a write-in image by exposing it to uniform illumination which is absorbed, e.g., that having a wavelength of from about 375 to about 460 nanometers for the bismuth silicon oxide crystal 1. This can be accomplished by using a xenon flash tube 13 which emits a short pulse of light, e.g., about 1 to 10 microseconds. An EG&G type FX-108 AU xenon flash lamp with a 404 nanometer interference filter to produce a light pulse with a $2\times10^{-6}$ sec. half width operates suitably.

As shown, the short flash of erase/prime illumination is absorbed at the surface of the negatively biased side of the bismuth silicon oxide crystal. The absorbed illumination creates photo-injected hole-electron pairs of charge carriers which are separated by the applied field until they exactly cancel the externally applied voltage across the electro-optic crystal. Because bismuth silicon oxide is an n-type photoconductor, the photo-injected electrons have a much higher mobility than the holes, and they drift to the opposite side of the crystal. The applied voltage now drops primarily across the dielectric layers. If the bismuth silicon oxide were a p-type photoconductor, such as it might be if it were heavily doped with aluminum or other dopants, the xenon flash lamp would be located on a positively biased side of the crystal since the holes would be expected to drift. Thus, a rapid and efficient technique for erasing previous information in the bismuth silicon oxide, and for priming the crystal for a write-in exposure, results by taking advantage of the charge carriers generated in the crystal.

In FIG. 1(*c*), the applied voltage is removed and the electrodes are shorted by moving switch 7 to the short circuit position 11 as shown. When the applied voltage is thus removed, and the converter short circuited, the charge carriers created in the erase/prime step create a voltage which is distributed across the electro-optic material and the dielectric layers as shown by the solid line. In practice, because the capacitance of the dielectric layers is very much larger than that of the electro-optic material, very little charge is transferred to the electro-optic material and the voltage drop across the electro-optic material after shorting is very nearly equal to the externally applied voltage before shorting. Thus, if the voltage applied is the half-wave voltage, or half of the half-wave voltage for retro-reflection read-out, then that voltage is available for electro-optic write-in. The converter is ready, at this stage, for a new write-in operation.

In FIG. 1(*d*), the converter is illustrated with the top half exposed to write-in light 15 which is absorbed by the crystal 1, whereas the bottom half is illustrated as non-exposed. In the bottom half, the voltage drop shown in FIG. 1(*c*) remains unchanged. In the exposed top half, the write-in light lowers the internal voltage drop across crystal 1 in proportion to the amount of exposure at each point. Write-in illumination 15 is directed at a surface of the crystal 1 which is negatively biased to once again take advantage of the much higher mobility of the photogenerated electron charge carriers in comparison to the holes.

As can be seen in FIG. 1(*d*), there is a significant difference in the internal field in the exposed areas of the device compared to the non-exposed areas. This difference in the voltage drop across the crystal can be read out and is representative of information read into the converter by the write-in light pattern. One suitable technique for reading information out is to pass non-absorbing plane polarized light, such as plane polarized red light 17, through the device and to detect the relative phase retardation created by the Pockel's linear electro-optic effect of a crystal such as bismuth silicon oxide. Another suitable technique, referred to as retro-reflection read out, is to reflect plane polarized light from a dichroic reflector located at the front surface so that the read out light passes through the crystal twice. Retro-reflection read out has the advantage of negating phase retardation of the read-out light due to the inherent optical activity exhibited by some electro-optic materials, including bismuth silicon oxide. Retro-reflection read out is well known in the art, and described in considerable detail in: Pritchard, D. H., "A Reflex Electro-optic Light Valve Television Display," *RCA Review*, December, 1969, pp. 567–92; and Kazan, B. and Knoll, M., *Electronic Image Storage*, Academic Press, 1968, pp. 399–408; the teachings of these references related to reflex or retro-reflection read-out are hereby incorporated by reference. A suitable dichroic reflector shown as element 6 in FIG. 1(*a*), and is omitted from the other Figures for simplification. Of course, the dichroic reflector should be designed to pass write-in light but to reflect read-out light.

The decay of a stored write-in image by read-out light can be minimized by illuminating a positively biased surface of the crystal with read-out light. As explained above, the positively biased surface of an n-type electro-optic crystal is relatively photo-insensitive.

Figure 2:
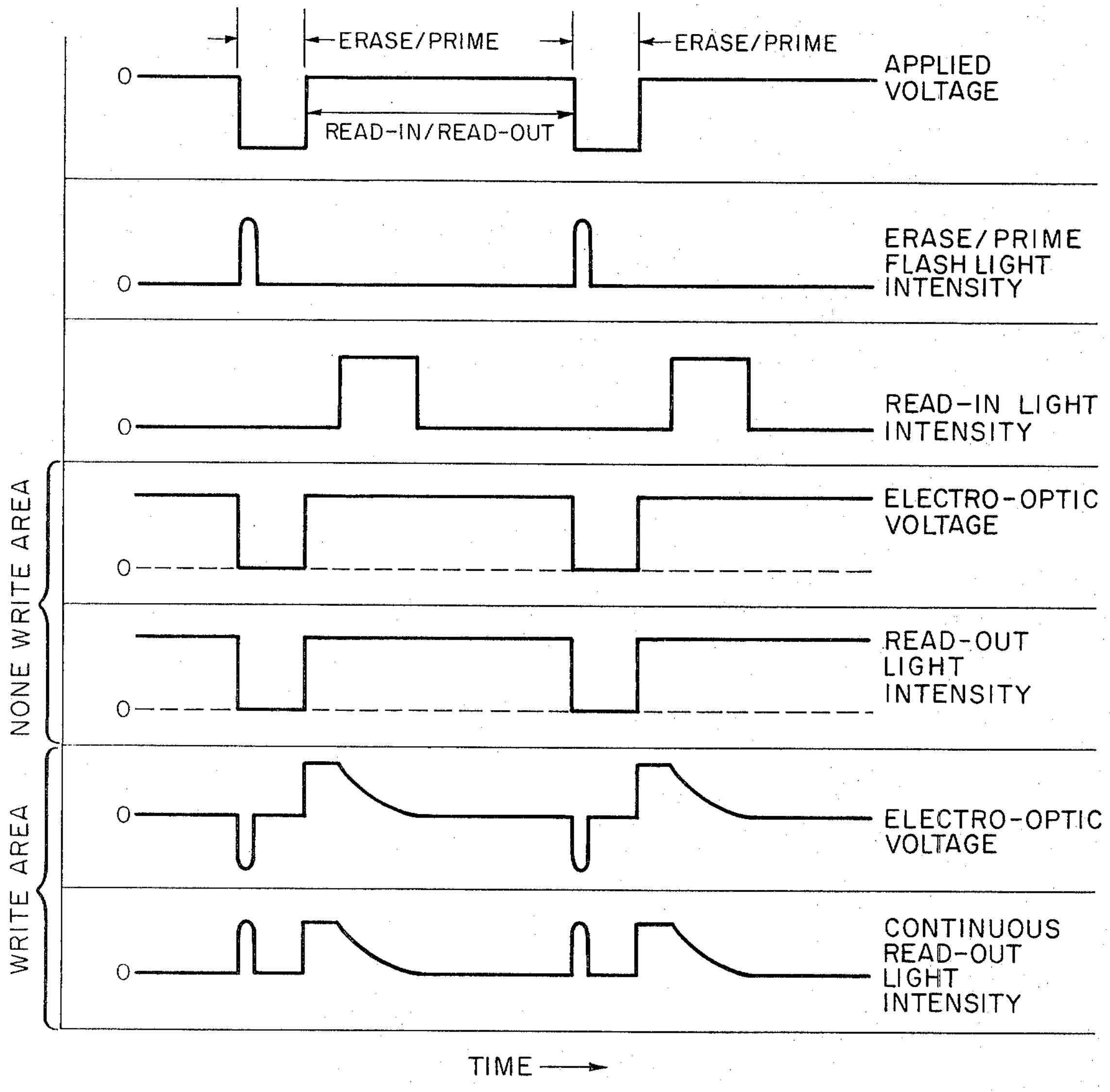
FIG. 2 is a graphical illustration of the various voltages and illumination intensities encountered with the improved technique of operating an electro-optic image converter described herein.

The voltage and light intensity patterns as a function of time in an electro-optic converter are illustrated in FIG. 2 for the technique of quasi continuous operation described herein. A repeating, square-wave, negative voltage pulse is illustrated such as that applied to a converter during the period in which the converter is erased and primed for the next read-in sequence. In practice, it is desirable to keep this pulse as short as possible, and it has been found that times of about 2 milliseconds are adequate for the operational power supply to apply voltages approximating the half-wave voltage of a bismuth silicon oxide crystal.

A short light pulse, such as that supplied by a xenon flash lamp, is applied while the negative external voltage pulse is applied to the crystal. Write-in illumination is applied after the device has been erased and primed, and after the converter's electrodes have been placed in the short circuited condition.

In the none write region of the crystal, such as the unexposed half of the converter shown in FIG. 1(*d*), the electro-optic voltage across the crystal remains at a constant positive value except during the time in which an externally applied negative voltage is applied across the converter. When the negative voltage is applied, the electro-optic voltage in none write regions of the crystal goes to zero since the portion of the negative external voltage which appears across the electro-optic crystal is exactly equal in magnitude and opposite in polarity to the positive voltage created across the crystal by the stored charge. Thus, the read-out intensity also stays at a constant level, except during the application of the external negative voltage.

In the write region of the crystal, the electro-optic voltage falls to a negative value upon the application of the applied voltage. The erase/prime flash discharges this voltage and the shorting step reapplies a similar voltage of opposite polarity. This latter voltage is decayed during the write step in accordance with the write-in light pattern. When the erase light strikes the crystal during the ensuing cycle, any remaining charge distribution in the crystal is decayed.

The continuous read-out light intensity in the write region rises upon application of the applied voltage and then decays sharply during the erase/prime flashing, rises with an opposite polarity when the device is short circuited, and then decays according to the write-in light pattern.

One complete cycle or frame in the operation of the converter begins when the applied negative voltage pulse starts. The cycle ends when read-out has been completed while the converter is short circuited.

What is claimed is:

1. In the operation of an electro-optic light converter formed from a single crystal of cubic n-type bismuth silicon oxide having relatively thin, transparent, dielectric layers bonded to opposite faces thereof and transparent electrodes attached to said dielectric layers, wherein a series of information patterns are written into the bismuth silicon oxide crystal by exposing it to patterns of absorbed write-in light representative of said information patterns, the improvement comprising:

Erasing previous information in the crystal and priming the crystal for the next write-in sequence by exposing the crystal to light which is absorbed while simultaneously applying a negative voltage to the exposed face to generate electron-hole pairs sufficient to neutralize any remaining charge pattern present in the crystal.

2. An improvement of claim 1 wherein said erase and priming exposure comprises a short pulse of light having a wavelength of from about 375 to about 460 nanometers.

3. An improvement of claim 2 wherein said pulse has a duration of from about 1 to about 10 microseconds.

4. A process for quasi continuously operating an electro-optic converter formed from a cubic, single crystal of n-type bismuth silicon oxide having relatively thin, transparent dielectric layers bonded to the front and rear faces thereof, transparent electrodes in contact with said layers, means for applying a predetermined voltage pattern to said electrodes, and a dichroic reflector located at the front face of said crystal, comprising:

a. applying a negative voltage pulse to the rear face of said crystal;

b. erasing and priming the crystal by exposing the rear face of said crystal to a short uniform pulse of absorbed light, thereby producing mobile charge carriers sufficient to neutralize any previous charge pattern therein;

c. removing the applied voltage and short-circuiting the electrodes;

d. writing information into the crystal by exposing its front face to a pattern of write-in light which is absorbed by said crystal;

e. reading the information out by exposing the rear face of said crystal to non-absorbed read-out light whereby said light passes through the crystal and is reflected from the dichroic reflector; and, f. sensing the modulation of reflected read-out light.

5. A process of claim 4 wherein said erasing and priming is accomplished by exposing the rear face of said crystal to a pulse of light having a duration between about 1 and about 10 microseconds and having a wavelength of from about 375 to about 460 nanometers.

6. A process of claim 5 wherein the front face of said crystal during the read-out exposure is positively biased.

7. A process of claim 6 wherein the negative voltage pulse applied during the write-in exposure is equal to about one-half of the half-wave voltage of bismuth silicon oxide.

8. A process of claim 7 wherein said read-out light comprises plane polarized red light.

9. A process of claim 8 wherein said erasing and priming exposure is accomplished with a xenon flash lamp.

10. A process of claim 9 wherein said write-in light comprises blue light.

11. A process of claim 10 wherein sensing the modulation is accomplished by determining the relative phase retardation of read-out light introduced by the Pockel's linear electro-optic effect present in cubic, single crystal bismuth silicon oxide.

12. A process for quasi continuously operating an electro-optic device formed from electro-optic and photoconductive materials, said process including writing in, reading out, and erasing/priming steps, comprising:

a. maintaining a predetermined voltage pattern across said electro-optic and photoconductive media;

b. exposing said photoconductive medium to a pattern of light which is absorbed by said photoconductive medium, said pattern being representative of information to be written into said electro-optic medium so that an electric charge distribution in said electro-optic medium will vary according to said pattern of information;

c. sensing the variations in the charge distribution of said electro-optic medium; and, d. erasing and priming said electro-optic and photoconductive media to receive another pattern of write-in light by illuminating a face of said photoconductive material with a short pulse of uniform absorbed light while simultaneously applying a voltage polarity to said illuminated face which takes advantage of the inherent type of photoconductivity in the photoconductor to produce mobile charge carriers sufficient to neutralize any charge pattern distributions remaining from previous write-in images.

13. A process of claim 12 wherein said electro-optic and photoconductive materials comprise a single crystal of cubic, n-type bismuth silicon oxide.

14. A process of claim 13 wherein said predetermined voltage pattern includes a negative voltage pulse at the face of said bismuth silicon oxide being exposed to erase/prime light.

15. An electro-optic apparatus comprising:

a. an electro-optic medium having an optical property that varies according to a voltage pattern applied across said medium;

b. a photoconductive medium associated with said electro-optic medium;

c. means for applying a predetermined voltage pattern across said electro-optic and photoconductive media;

d. means for exposing said photoconductive medium to a pattern of light which is absorbed by said photoconductive medium, said pattern being representative of information to be written into said electro-optic medium to cause the optical property of said electro-optic medium to vary according to said pattern of information;

e. means for sensing variations in the optical property of said electro-optic medium; and, f. means for erasing and priming said electro-optic medium to receive another information pattern of light by producing mobile charge carriers in said photoconductive medium which are sufficient to neutralize any internal field within said electro-optic medium, said means for erasing and priming including means for flashing one face of said photoconductive medium with uniform, short pulses of absorbing light and means for maintaining an appropriate voltage on the face illuminated with erase light to take advantage of the inherent type of photoconductivity present in said photoconductive medium.

16. An apparatus of claim 15 wherein said electro-optic medium and said photoconductive medium comprise a single crystal of cubic, n-type bismuth silicon oxide.

17. An apparatus of claim 16 wherein said means for exposing to write-in light and said means for flashing are positioned to illuminate opposite sides of said bismuth silicon oxide crystal.

18. In the operation of an electro-optic, photoconductive image converter including a p-type photoconductor, said operation including flooding a surface of said photoconductor with absorbed light to erase and prime the electro-optic device, the improvement comprising simultaneously applying a positive voltage pulse to the surface of said photoconductor which is flooded with absorbed light to thereby take advantage of the photoconductor's inherent p-type photoconductivity.

19. In the operation of an electro-optic, photoconductive image converter including an n-type photoconductor, said operation including flooding a surface of said photoconductor with absorbed light to erase and prime the electro-optic device, the improvement comprising simultaneously applying a negative voltage pulse to the surface of said photoconductor which is flooded with absorbed light to thereby take advantage of the photoconductor's inherent n-type photoconductivity.

* * * * *